Patented Aug. 19, 1924.

1,505,176

UNITED STATES PATENT OFFICE.

STANLEY M. UDALE, OF DETROIT, MICHIGAN, ASSIGNOR TO EARL HOLLEY, OF DETROIT, MICHIGAN.

MOLD COATING.

No Drawing.    Application filed November 30, 1923. Serial No. 677,897.

*To all whom it may concern:*

Be it known that I, STANLEY M. UDALE, a citizen of the United States, residing at 893 Lothrop Ave., Detroit, in the county of Wayne and State of Michigan, have invented certain new and useful Improvements in Mold Coatings, of which the following is a specification.

This invention relates to an improved coating material adapted to be used for the protection of the surface of metal molds exposed to the action of molten metals. This invention relates specifically to the production of a mold wash which when applied to a heated mold will deposit thereon an extremely smooth and adherent heat insulating refractory coating of exceedingly minute particles of fire clay.

The ideal coating would consist of a molecular distribution of fire clay on the surface of the iron. The nearest approach to molecular sub-division is the colloidal suspension of solids in liquids.

The inventor has discovered that if fire clay be ground so as to be held in water as a colloidal suspension and to the water be added a little soluble silicate, a coating superior to that described in the patent to Meloche #1,453,593 will result. The reason for this is that with a finer sub-division of the fire clay a smaller percentage of soluble (sodium) silicate can be used to render the fire clay adherent to the iron molds, and as the sodium silicate reduces the refractory qualities of the fire clay, the less of it required the better.

The particles in suspension actually range from 0.00001 to 0.0001 millimeters in diameter, as compared with 0.008 millimeters in diameter, which is the size of the particles produced by ordinary grinding.

The colloidal suspension of fire clay in water is preferably made by mixing a quantity of powdered fire clay with four times the quantity of water and beating the mixture up, the beaters having a peripheral velocity of about forty meters per second or approximately ninety miles an hour, as described in "Engineering" (London, England), June 8, 1923, pages 705 and 706.

The molds, preferably of cast iron, are heated well above the boiling point of water and the dilute solution of sodium silicate mixed with colloidal fire clay (in suspension) is applied to the surfaces of the molds, which are heated between each application to ensure rapid evaporation of the water and a uniform distribution of the fire clay over the surface of the mold.

The fire clay can be ground with an oil such as linseed, but then the binder would not stand up under temperatures of molten iron, although satisfactory with low melting point alloys.

What I claim is:

1. A coating for protecting metal molds, consisting of an inert refractory insulating material colloidally sub-divided and a small percentage of heat-resisting binder.

2. An insulating refractory wash for coating metal molds, consisting of fire clay in colloidal suspension in a liquid in which there is dissolved a small percentage of heat-resisting binder.

3. An insulating refractory wash for coating metal molds, consisting of a colloidal suspension of fire clay in a liquid, which liquid acts on evaporation as a binder for the colloidal particles of fire clay.

In testimony whereof I affix my signature.

STANLEY M. UDALE.